United States Patent Office 3,404,958
Patented Oct. 8, 1968

3,404,958
PROCESS FOR THE PREPARATION OF
PERCHLORYL FLUORIDE
Anthony J. Beardell, Morris Plains, and Chester J. Grelecki, Denville, N.J., assignors, by mesne assignments, to the United States of America as represented by the Secretary of the Navy
No Drawing. Filed Mar. 31, 1965, Ser. No. 444,466
4 Claims. (Cl. 23—203)

ABSTRACT OF THE DISCLOSURE

A process for the preparation of perchloryl fluoride by reacting nitryl perchlorate with chlorine trifluoride and then recovering perchloryl fluoride by cooling and condensing the reaction mixture.

---

The present invention relates to an improved method for preparing perchloryl fluoride, $ClO_3F$.

Perchloryl fluoride is characterized by its heptavalent chlorine, $Cl^{+7}$. Its structural formula is

The compound is a colorless gas at ordinary temperatures. When liquefied, it boils at $-47.5°$ C. at 760 mm. pressure. On further cooling, it solidifies to a white crystalline solid at $-146°$ C. The gas has been found to be thermally stable at least up to 900° F. Gaseous perchloryl fluoride is readily liquefied and can be stored as a liquid for long periods of time.

Chemically, perchloryl fluoride is a strong oxidant which vigorously supports combustion, but which, surprisingly, does not spontaneously ignite most organic materials as do other strong oxidants. For example, unlike fluorine and liquid oxygen, perchloryl fluoride may be brought into contact with most organic materials at ordinary temperatures and atmospheric pressure without igniting them. The gas is readily liquefied and can be stored as a liquid for long periods of time.

Perchloryl fluoride has potential value as an oxidizing agent in dye chemistry, as a chemical cutter for steel, as a component of an explosive for mining and construction work, and as a liquid propellant, being in this respect similar to liquid oxygen, hydrogen peroxide and nitric acid. Importantly, $ClO_3F$ possesses the added advantages of having relatively low pressures at ordinary temperatures (about 150 p.s.i. at 75° F.) and of being capable of prolonged storage as a liquid in ordinary steel cylinders without loss or deterioration. Its physical and chemical properties thus make perchloryl fluoride a remarkably useful and valuable oxidant.

The preparation of perchloryl fluoride involves the combination of fluorine and oxygen with chlorine in its highest state of oxidation. Perchloryl fluoride has been prepared by starting with a salt of an oxychloride in which the chlorine is at a lower level of oxidation and simultaneously oxidizing and metathesizing the salt with an oxidizing fluorinating agent, e.g., reaction potassium chlorate with elemental fluorine (H. Bode and E. Klesper, Z. anorg. Allg. Chem. 266, 275–280, 1951).

Another method (A. Engelbrecht and H. Atzwanger, Mh. Chem. 83, 1087, 1952) is based on methathesis of a metal salt of an oxychloride in which chlorine is in its highest valence state with an acid fluoride under conditions of electrolysis, e.g., electrolysis of sodium perchlorate in anhydrous hydrofluoric acid.

The two above-described methods for preparing perchloryl fluoride have a disadvantage in that the yield of perchloryl fluoride is exceedingly low by commercial standards. Accordingly, most of the work with methods of preparing perchloryl fluoride has been to increase the yield. In U.S. Patent 2,942,947, which issued June 28, 1960, to Alfred F. Engelbrecht, there is described a method of preparing perchloryl fluoride by reacting antimony pentafluoride with alkali metal and alkaline earth metal perchlorates and with aqueous perchloric acid. This discovery was considered to be significant due to the fact that the prediction of a successful fluorinating agent for reaction with a perchlorate for formation of perchloryl fluoride is not possible, as evidenced by the finding that certain of the highly reactive common fluorinating agents do not readily form perchloryl fluoride, or form none at all, when they are reacted with a perchlorate. For example, fluorine, anhydrous hydrofluoric acid in the absence of electrolyzing conditions, antimony trifluoride, and other fluorinating agents were found unsuccessful for this purpose.

In the process described in U.S. Patent 2,942,947, yields of about 50 percent are indicated. In U.S. Patent 2,982,617, which issued May 2, 1961, to William A. La Lande, Jr., yields of about 73 percent were indicated by producing perchloryl fluoride by metathesis of a salt of perchloric acid with materials furnishing fluosulfonic acid. In another patent, U.S. Patent 2,982,618, which also issued May 2, 1961, to Howard M. Dess, there is described a process for preparing perchloryl fluoride by reacting an inorganic perchlorate with fluosulfonic acid in the presence of a catalyst, such as boron trifluoride, antimony trifluoride, or hydrogen fluoride. Yields of between 73 and 85 percent are indicated. In still another patent, U.S. Patent 2,942,949, which issued June 28, 1960, to Gerhard Barth-Wehrenalp and Harry Creston Mandell, Jr., yields of about 97 percent are indicated for a process of preparing perchloryl fluoride by reacting a fluorinating agent comprised of a mixture of fluosulfonic acid and antimony pentafluoride with an inorganic perchlorate.

In the present invention, perchloryl fluoride is prepared by the action of chlorine trifluoride on an inorganic salt perchlorate. The chlorine trifluoride is condensed over the perchlorate and the mixture is then permitted to stand at room temperature for several hours. The perchloryl fluoride is then isolated by cooling the reaction mixture.

It is therefore a general object of the present invention to provide a new and improved method of preparing perchloryl fluoride.

Another object of the present invention is to provide a method of preparing perchloryl fluoride wherein the reaction may be performed in a liquid phase.

Other objects and advantages of the present invention will be readily appreciated as the same becomes better understood by reference to the following detailed description.

Example

A 4.9 mole percent solution of nitryl perchlorate ($NO_2ClO_4$) in chlorine trifluoride ($ClF_3$) was prepared. The perchlorate salt dissolved readily and the mixture was permitted to stand for about 60 hours at room temperature during which time the pressure slowly rose from 15 p.s.i.a. to 28 p.s.i.a. Infrared examination of the gases revealed the presence of large concentrations of perchloryl fluoride ($ClO_3F$) and smaller amounts of $ClO_2F$, chlorine dioxide ($ClO_2$) and nitryl chloride ($NO_2Cl$). The perchloryl fluoride formed was isolated by cooling the reaction mixture to $-80$ degrees C. The perchloryl fluoride was then condensed as a solid at a temperature of $-196$ degrees C.

It can thus be seen that the present invention relates to a new process for preparing perchloryl fluoride. Obviously many modifications and variations of the present invention are possible in the light of the above teachings. It is therefore to be understood, that within the scope of the appended claims, the invention may be practiced otherwise than as specifically described.

What is claimed is:

1. A process for the preparation of perchloryl fluoride which comprises reacting nitryl perchlorate with chlorine trifluoride.

2. A process for the preparation of perchloryl fluoride which comprises reacting nitryl perchlorate with chlorine trifluoride in the ratio of about 0.05 mole of nitryl perchlorate per mole of chlorine trifluoride.

3. A process for the preparation of perchloryl fluoride which comprises:
   reacting nitryl perchlorate with chlorine trifluoride,
   then allowing the reaction mixture to stand for about sixty hours at room temperature, and
   then cooling said reaction mixture to about minus 80 degrees C. and passing said cooled reaction mixture through a condenser whereby perchchloryl fluoride is recovered as a solid.

4. A process for the preparation of perchloryl fluoride as set forth in claim 3 wherein the ratio of nitryl perchlorate to chlorine trifluoride is about 0.05 mole of nitryl perchloride per mole of chlorine trifluoride.

References Cited

UNITED STATES PATENTS

| 2,942,947 | 6/1960 | Engelbrecht. |
| 2,942,949 | 6/1960 | Barth-Wehrenalp et al. |
| 2,982,617 | 5/1961 | La Lande. |
| 2,982,618 | 5/1961 | Dess. |

EDWARD J. MEROS, *Primary Examiner.*

H. S. MILLER, *Assistant Examiner.*